Figure 1:
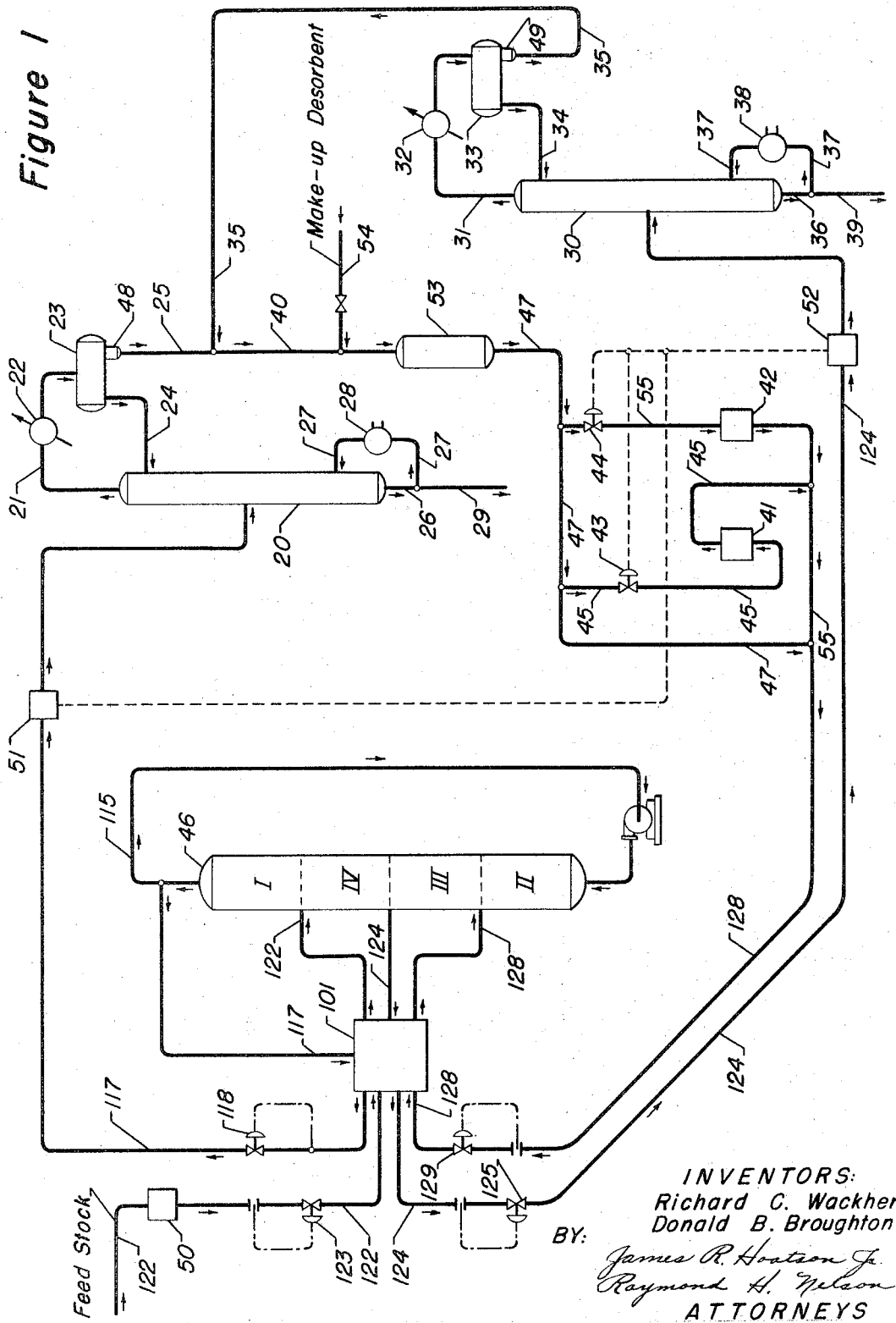

United States Patent Office 3,306,848
Patented Feb. 28, 1967

3,306,848
ZEOLITE AND ZEOLITE SEPARATION PROCESS
Richard C. Wackher, Palatine, and Donald B. Broughton, Evanston, Ill., assignors to Universal Oil Products Company, Des Plaines, Ill., a corporation of Delaware
Filed May 27, 1964, Ser. No. 370,624
22 Claims. (Cl. 208—310)

This invention relates to a process for the separation of normal aliphatic hydrocarbons from a fluid mixture employing zeolites commonly known as molecular sieves. This invention also relates to an improved zeolite having enhanced selective extractive properties. More specifically, this invention relates to a process for the separation of normal aliphatic hydrocarbons from a fluid mixture by contact with a selective sorbent in which at least one polar molecule selected from the group consisting of water, ammonia, glycols, amines and alcohols is incorporated into the selective sorbent. Still more specifically, this invention relates to the step of incorporating at least one polar molecule selected from the group consisting of water, amonia, glycols, amines and alcohols into a selective sorbent so as to enhance the selective extraction of heavy normal aliphatic hydrocarbons on said sorbent. Further, this invention relates to a zeolite sorbent having incorporated therein at least one polar molecule selected from the group consisting of water, ammonia, glycols, amines and alcohols.

In one of its embodiments this invention relates to a method for improving the selective extraction of a zeolite selective for normal aliphatic hydrocarbons which comprises maintaining on said zeolite at least one polar molecule selected from the group consisting of water, ammonia, glycols, amines and alcohols.

In another of its embodiments this invention relates to a process for the separation of components of a fluid mixture, at least one of which is selectively sorbed by contact with a solid sorbent, said process comprising the steps: introducing a fluid mixture into contact with a bed of solid sorbent particles; withdrawing from said bed a first effluent comprising relatively less sorbed component of said fluid mixture; introducing a desorbing fluid comprising another selectively sorbed component into contact with said bed of solid sorbent particles, withdrawing from said bed a second effluent comprising selectively sorbed component of said fluid mixture, and maintaining on said sorbent at a desired concentration at least one polar molecule selected from the group consisting of water, ammonia, glycols, amines and alcohols.

In another of its embodiments this invention relates to a process for the separation of a normal aliphatic hydrocarbon from a fluid hydrocarbon mixture, said process comprising the steps: introducing said fluid hydrocarbon mixture into contact with a bed of solid zeolitic metal alumino-silicate particles selective for normal aliphatic hydrocarbons; withdrawing from said bed a first effluent comprising relatively less sorbed component of said fluid hydrocarbon mixture; introducing a desorbing fluid comprising another normal aliphatic hydrocarbon into contact with said bed of solid zeolite particles; withdrawing from said bed a second effluent comprising selectively sorbed component of said fluid hydrocarbon mixture; and maintaining on said zeolite at concentrations of from about 0.5 to about 4 wt. percent at least one polar molecule selected from the group consisting of water, ammonia, glycols, amines and alcohols small enough in molecular size to be incorporated within said zeolite.

In still another of its embodiments this invention relates to a process for the separation of components of a fluid mixture, at least one of which is selectively sorbed by contact with a solid sorbent, said process comprising the steps: introducing said fluid mixture into a first zone of a fixed bed of said solid sorbent containing at least four serially interconnected zones having fluid flow connecting means between adjacent zones and between the outlet of one terminal zone and the inlet of the other terminal zone in the series to thereby provide cyclic fluid flow in said process; substantially simultaneously withdrawing relatively less sorbed raffinate from a second zone immediately downstream of said first zone; substantially simultaneously introducing a desorbing fluid into a third zone immediately downstream of said second zone; substantially simultaneously withdrawing resulting sorbate comprising selectively sorbed component from a fourth zone immediately downstream of said third zone; continuously circulating a stream of fluid through said series of interconnected zones; periodically advancing downstream the point in said fixed bed of introducing said fluid mixture while simultaneously and equally advancing downstream the point of introducing desorbent and withdrawing raffinate and sorbate; and maintaining on said sorbent at a desired concentration at least one polar molecule selected from the group consisting of water, ammonia, glycols, amines and alcohols.

In another of its embodiments this invention relates to a crystalline synthetic zeolite material comprising the elements silicon, aluminum, oxygen, at least one cation selected from the group of materials consisting of hydrogen, ammonium, metals in Group I and Group II of the Periodic Table and the transition metals of the Periodic Table and having water incorporated therein in the range of from about 0.5 to about 4 wt. percent.

In still another of its embodiments this invention relates to a crystalline synthetic zeolite material having a composition in terms of oxides of $$1.0\pm0.2\ M_{2n}O:Al_2O_3:1.85\pm0.5\ SiO_2$$

wherein M represents at least one of the materials in the group consisting of hydrogen, ammonium, metals in Group I and Group II of the Periodic Table, and the transition metals, $n$ represents the valence of M, and having water incorporated therein in the range of from about 0.5 to about 4 wt. percent.

In a more specific embodiment this invention relates to the step of adding and maintaining on a zeolite at least one polar molecule selected from the group consisting of water, ammonia, glycols, amines and alcohols in concentrations of from about 0.5 to about 4 wt. percent of the zeolite in a process for the separation of normal aliphatic hydrocarbons from fluid mixtures employing zeolitic metal-aluminosilicates as a selective sorbent.

In another still more specific embodiment this invention relates to the step of measuring the water concentration of at least one of the effluent streams from a zeolite and adjusting the water concentration of at least one of the inlet streams to said zeolite so as to maintain a desired water concentration on said zeolite in a process for the separation of normal aliphatic hydrocarbons from a fluid mixture by contacting said fluid mixture with a zeolite selective for normal aliphatic hydrocarbons.

Molecular sieves have become increasingly important in the field of adsorbents in the past few years. The sieves are of crystalline structure having many small cavities connected by still smaller pores of uniform size. These pores may vary in size from 3 Angstrom units up to 12 or 15 or even more. However, a particular molecular sieve will desirably have uniform pore sizes. These crystalline aluminosilicate materials are chemically similar to clay and feldspars and belong in the class of material called zeolites. Zeolites vary somewhat in composition although they generally contain the elements aluminum, silicon, oxygen and an alkali and/or alkaline earth metal. It is possible to exchange the cation metal with other materials such as hydrogen or ammonia. The zeolites may be dehydrated without the crystal structure being destroyed leaving an interlaced crystal structure of regularly spaced channels.

There are a number of commercially available molecular sieves, each having a particular pore size. These molecular sieves are useful in many applications such as the drying of various materials and separating hydrocarbon molecules by molecular size selectivity. In this latter-mentioned application the molecular sieves having pore sizes of about 5 Angstrom units can separate normal aliphatic hydrocarbons from fluid mixtures by selective sorption of the normal molecules because the pore size of the molecular sieve is too small for non-normal molecules to occlude into the porous structure of said molecular sieve. Normal molecules are defined to mean straight-chain molecules such as normal butane, normal heptane, normal heptene, etc. In order to provide a useful method for the separation of normal from non-normal molecules, it is necessary to desorb the occluded normal compounds. This can be accomplished by means of other normal compounds, preferably of a different molecular weight than the occluded normal compounds.

The separation of normal hydrocarbons from fluid mixtures using zeolitic molecular sieves has been known for a number of years. For example, a process for the separation of normal paraffins using molecular sieves is presented in U.S. Letters Patent No. 2,920,037, issued on June 5, 1960. Another example is shown in U.S. Letters Patent No. 2,957,927, issued on October 25, 1960. The concept of the use of moving inlets and outlets to simulate countercurrent flow of sorbent and feed using sorbents such as molecular sieves has also been known for several years. For example, such a process is disclosed in U.S. Letters Patent No. 2,985,589, issued on March 23, 1961. These processes employ the use of a separate desorbent which is generally outside the molecular weight range of the feed stock employed. Critical factors in these processes are the rate of sorption of the selectively sorbed molecules and the selectivity of the sorbent for the selectively sorbed molecules. If the rate of sorption is slow, or if the selectivity of the sorbent for the sorbed molecule is low, the overall amount of extraction will be low. If heavy hydrocarbons are used as the desorbent or if the feed stock contains heavy hydrocarbons, this low extraction will greatly decrease the efficiency of processes such as those mentioned above.

It has been observed that heavier normal hydrocarbon molecules generally exhibit a greater preference (selectivity) to be sorbed by molecular sieves than do lighter normal hydrocarbons if the reactants are allowed to stand until equilibrium is achieved. However, it has also been observed that heavier normal molecules exhibit a lower rate of sorption than do the lighter normal hydrocarbons. This lower rate of sorption can greatly reduce the efficiency of a process for the separation of heavy normal molecules. If the feed stock to be separated is a heavier feed stock (for example, in the kerosene boiling range or higher), this lower rate can result in such decreased efficiency as to make the process uneconomical. In general, heavier feed stocks may be defined as having at least ten carbon atoms per molecule. Any method or device which can increase the rate of sorption or change the selectivity of heavier normal components on a sorbent would be useful.

It is an object of this invention to produce a zeolite having enhanced selective extractive properties to obviate the above-mentioned difficulties. It is another object of this invention to produce a zeolite having enhanced selective extractive properties over those presently available. It is a further object of this invention to provide a process to preserve the enhanced selective extractive zeolite. It is a further object of this invention to provide a process for the separation of normal aliphatic hydrocarbons from fluid mixtures. It is a still further object of this invention to provide a process for the separation of normal aliphatic hydrocarbons from fluid mixtures by contact with a sorbent selective for said normal hydrocarbons having enhanced selective extraction for heavy hydrocarbons. It is still another object of this invention to provide a simulated countercurrent process for the separation of normal aliphatic hydrocarbons from fluid mixtures employing zeolites having enhanced selective extraction of heavier normal aliphatic hydrocarbons. It is a still further object to present a method to enhance the rate of selective sorption of heavier normal aliphatic hydrocarbons into the porous structure of a zeolite selective for said normal aliphatic hydrocarbon. It is a further object to provide a process for the separation of normal paraffins from liquid mixtures by contact with a zeolite selective for normal paraffins in the liquid phase, said zeolites having enhanced selective extractive properties.

It has been discovered that when certain polar molecules are incorporated into the porous structure of molecular sieves, selective for normal aliphatic hydrocarbon molecules, in certain concentration ranges, the extent of extraction of heavier normal aliphatic hydrocarbons is increased. More specifically, the polar molecules are selected from at least one of the group consisting of water, ammonia, glycols, amines and alcohols. Two important characteristics of a suitable polar molecule are its molecular size and the extent of its polarity. Of course, the polar molecule must be small enough in molecular size to pass into the porous structure of the molecular sieve. It must also be firmly adsorbed and held on the molecular sieve. One of the preferred polar molecules is water. It is inexpensive, readily available and its concentration on the zeolite may be easily regulated. Under equilibrium conditions it is possible to regulate the concentration of water in the molecular sieve by regulating the water concentration in the liquid which surrounds the molecular sieve. Water has the desirable characteristic of permitting a reasonable concentration of water in the molecular sieve without too high a concentration in the surrounding liquid. For example, it has been found that a hydrocarbon containing about 30 parts per million of water will allow a water concentration of about 2.5 wt. percent on a molecular sieve at equilibrium at temperatures of about 450° F. It is a relatively easy step to adjust the water concentration in the hydrocarbon which will contact the molecular sieve. In a preferred method, the water concentration may be adjusted upward by dissolving small quantities of liquid water into the hydrocarbon and adjusted downward by contacting the hydrocarbon with a suitable dryer before contacting said hydrocarbon with the molecular sieve. The desired concentration is from about 0.5 to about 4 wt. percent. The lower limit is established by having a high enough concentration to materially improve the overall extraction. The upper limit is established by having such a great concentration as to substantially hinder the rate of sorption or to impair the capacity of the molecular sieve. Within these two extremes the optimum concentration will depend upon the polar molecule employed, the molecular weight of the charge stock and the desorbent, the temperature, pressure and charge rate through the molecular sieve bed.

The essence of this invention involves the step of incorporating at least one polar molecule selected from the group consisting of water, ammonia, glycols, amines and alcohols into the porous structure of a molecular sieve and methods for the maintenance of said polar molecule on said molecular sieve in desired concentrations. This invention may be incorporated into known separation processes such as shown in FIGURE 1 to enhance the performance of said process. In a preferred embodiment, this invention is shown incorporated into a simulated countercurrent process for the separation of normal aliphatic hydrocarbons from a fluid mixture in FIGURE 1 using water as the polar molecule.

Figure 2:
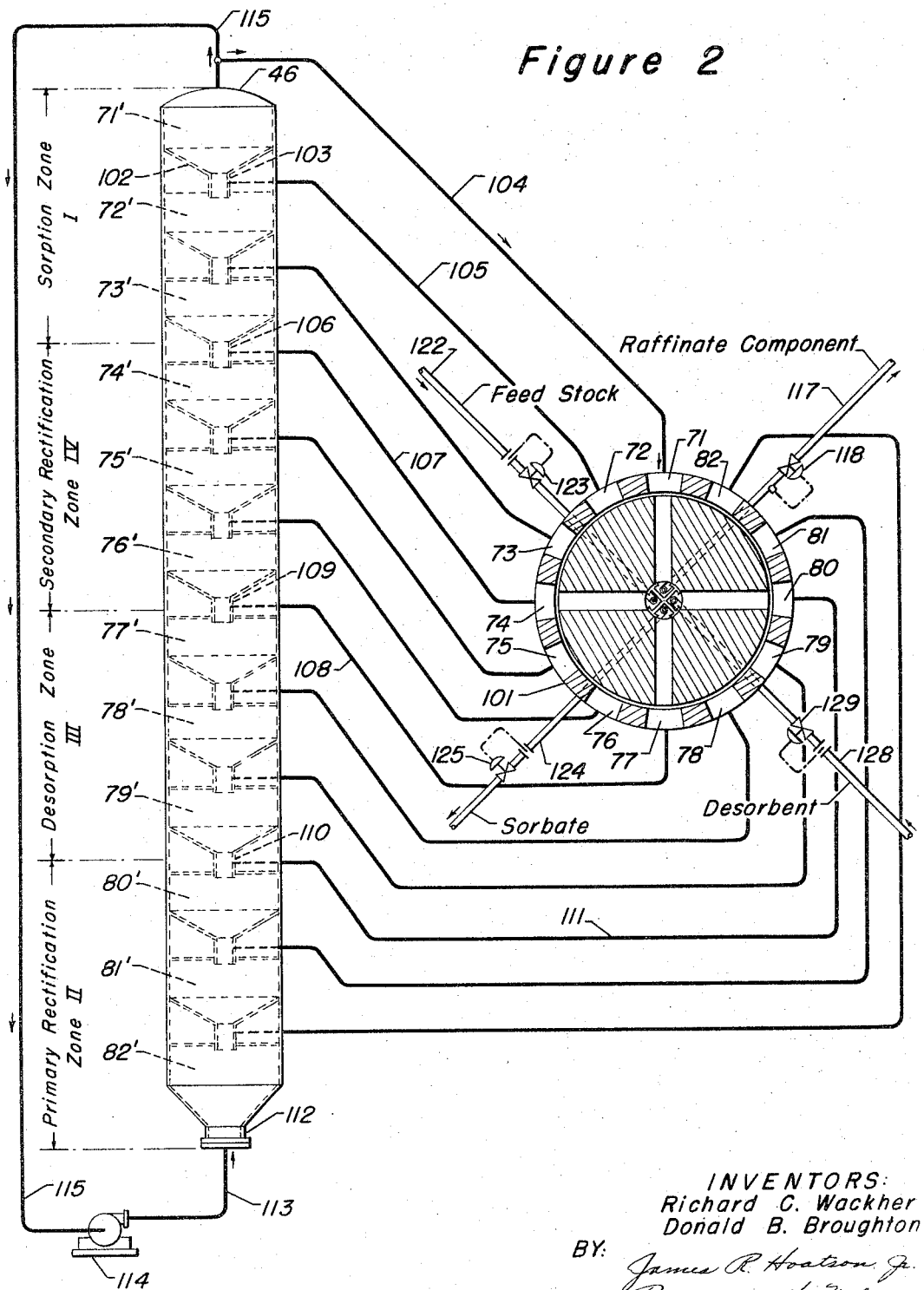

One of the essential parts of the preferred embodiment is sorbent contacting chamber 46 shown in FIGURE 1. Said chamber is capable of having introduced to it continuously a feed mixture and a desorbing fluid while simultaneously having withdrawn a relatively less sorbed raffinate and a sorbate. Sorbent contacting chamber 46 represents any suitable apparatus comprising a series of fixed beds or, if desired, one single continuous bed of sorbent having fluid flow connecting means between the outlet of one bed and the inlet of its next adjacent bed and comprising suitable means, such as a valve or manifold, for shifting the points of inlet and outlet for the various feed and product streams involved in the process. FIGURE 2 illustrates one of the preferred contacting chamber designs being particularly suitable because of its compact arrangement of the series of fixed beds in adjacent relationship to each other. The series of fixed beds may be a number (at least four) of horizontally spaced, separate beds interconnected by a pipe between the bottom of one bed and the top of its upstream adjacent bed, or the beds may be stacked one upon another within a suitable vertical column as illustrated in FIGURE 2 herein referred to in its entirety as contacting chamber 46 containing suitably shaped partitioning means which divide the column into a series of adjacent contacting beds such as beds 71′ through 82′, each bed being divided from its adjacent contacting beds (except the uppermost and lowermost beds) by a funnel-shaped partitioning member such as partition 102 located between beds 71′ and 72′ having upcomer 103 of restricted cross-sectional area opening from bed 72′ into downstream subadjacent bed 71′.

An essential portion of this part of the process, essential, that is, to the realization of simulated countercurrent flow of solid and liquid, is the provision of a suitable programming device for changing the points of inlet and outlet into and from the contacting chamber, for advancing each of these points in a downstream direction during the operation of this part of the process. Any suitable form of fluid distribution center such as a manifold arrangement of valves and incoming and outgoing lines may be provided with timed, electrically operated switches to open and close appropriate valves. The programming principle may also be suitably effected by means of a plug valve of particular design such as that rotary valve described and claimed in U.S. Patent No. 3,040,777, issued June 26, 1962.

Valve 101, representing a suitable programming device, contains a number of fluid inlet and outlet ports, 71 through 82, which are connected to the contacting beds in chamber 46 by flow conduits such as 104, 105, 107, 108 and 111. As shown in FIGURE 2, the feed stock is introduced through flow conduit 122, through valve 101 which is positioned to send the feed stock through port 74 and flow conduit 107 and into upcomer 106 and finally into bed 73′. The rate of introduction of feed stock through flow conduit 122 is controlled by suitable flow control, for example, employing an orifice in flow conduit 122 causing a pressure drop across said orifice, and suitable detection equipment to detect the pressure drop, compare said pressure drop to a preselected pressure drop and having an error signal actuate a control valve thus achieving flow control. The sorbate is withdrawn from upcomer 109 through flow conduit 108 into port 77 and out flow conduit 124 under similar flow control as described above. The desorbent is introduced through flow conduit 128, through valve 101 which is positioned to send the feed stock through port 80 and flow conduit 111 into upcomer 110 and finally into bed 79′ under similar flow control as described above. The reaffinate is withdrawn from flow conduit 104, through port 71, through valve 101 and out flow conduit 117. The rate of withdrawal of raffinate through flow conduit 117 is controlled by a suitable pressure control device such as an instrument which senses the pressure in chamber 46 and actuates a control valve to maintain a constant preselected pressure. A continuous stream of fluid is circulated from the chamber through flow conduit 115, through pump 114 and back into the chamber through flow conduit 113 thus maintaining fluid circulation through all the beds in the column.

Simulated countercurrent flow is achieved by periodically advancing downstream the point of introducing the feed stock and the desorbent while simultaneously and equally advancing downstream the point of withdrawal of raffinate and sorbate. This concept may be illustrated by reference to FIGURE 2. After a preselected time period the valve will rotate in such a manner that the feed stock enters chamber 46 between beds 72′ and 73′ since flow conduit 122 is now connected to port 73, sorbent is withdrawn between beds 75′ and 76′ since flow conduit 124 is now connected to port 76, desorbent is introduced between beds 78′ and 79′ since flow conduit 128 is now connected to port 79, and raffinate is withdrawn between beds 81′ and 82′ since flow conduit 117 is connected to port 82. Thus, by viewing FIGURE 2 and imagining that the valve has rotated one port in a clockwise direction, the inlets and outlets have been shifted downstream one bed. The continual shifting of the rotary valve will then accomplish the desired simulated countercurrent flow. This latter concept may be further illustrated using a relativity concept. Standing on the ground outside of chamber 46, it is clear to an observer that the sorbent does not move but is stationary. However, if the observer were placed inside chamber 46 and upon the solid sorbent, he would have the appearance of moving since the fluid in contact with the sorbent is continually changing. This equipment arrangement has the feature of making the sorbent think it is moving.

The sorbent contacting chamber may also be visualized as being a series of four interconnected zones of a single fixed bed of solid sorbent having no actual line of demarcation between each of the zones other than the zone boundaries defined by the points of inlet and withdrawal for the various fluid streams. In either case, all the zones are defined from the points of inlet and withdrawal. The sorption zone I in FIGURE 2 is defined as the zone bounded between the feed stock inlet and the raffinate outlet; the primary rectification zone II in FIGURE 2, as the zone bounded between the raffinate outlet and the desorbent inlet; the desorption zone III in FIGURE 2, as the zone bounded between the desorbent inlet and the sorbate outlet; and the secondary rectification zone IV in FIGURE 2, as the zone bounded between the sorbate outlet and the feed stock inlet.

The sorbent contacting chamber is operated at conditions of temperature, pressure and under other process conditions which depend upon the particular feed stock involved, the particular sorbent utilized and the required purity of product. Although this chamber may be operated either in the liquid or vapor phase, in many cases it is preferable to operate in the liquid phase. In general, in liquid phase operations the pressure is less than when employing gaseous phase conditions, the latter being dependent upon, generally, the molecular weight of the feed stock components. Typical liquid phase operation is, for example, temperatures of from 30° to 600° F., and more particularly 300° to 500° F., and pressures of from slightly superatmospheric to 30 atmospheres or higher depending primarily upon the feed stock. Generally higher pressures will be employed for lower molecular weight feed stocks to maintain liquid phase in the contacting chamber. In many cases it will be desirable to operate at conditions which will maintain the inlet and outlet fluids in the liquid phase but will maintain relatively lower viscosity to avoid excess pressure drop through the packed beds of sorbent as well as permit a more rapid rate of sorption and desorption. It is within the scope of the invention to utilize different temperatures in different zones of the fixed beds to take advantage of the rate of sorption and desorption due to differences in properties of the feed stock and the desorbent. This may be accomplished, for example, by heating one of the inlet streams or by heating both but to different temperatures prior to entering the contacting chamber.

Suitable feed stocks would include any fluid mixture which contains at least one component which is capable of being sorbed by a zeolite sorbent. A particularly suitable feed stock would be an organic liquid containing components that are selectively sorbed by a zeolite. A hydrocarbon fluid mixture containing at least one normal component would be an especially preferable feed stock.

Specific examples of hydrocarbon fluid mixtures would be a gasoline boiling range naphtha having an Engler distillation within the range of from 160° to 400° F., a kerosene, a distillate fuel having an Engler distillation end point up to approximately 700° F., and a lubricating oil having an Engler distillation within the range of from approximately 650° to 900° F. Preferable feed stocks are heavier hydrocarbon mixtures containing normal aliphatic hydrocarbons having at least ten carbon atoms per molecule.

This process may be employed to upgrade the octane number of naphthas by selectively removing the low octane normal compounds from the fluid mixture thus producing a fuel of enhanced octane number. This process can produce a concentrate of normal compounds either of a narrow or of a broad molecular weight which is useful as an intermediate in ultimately producing desirable products such as biodegradable detergents. Normal compounds also make efficient jet fuels. In the lubricating oil boiling range a concentrate of normal compounds is useful as a multi-viscosity lubricating oil. In this latter example, it becomes unnecessary to add synthetic organic compounds to lubricating oils in order to achieve the desired multi-viscosity specifications. The synthetic organic compounds are undesirable in that they substantially add to the cost of the lubricating oil and are frequently unstable.

The maximum charge rate of feed stock through the fixed bed of solid sorbent is limited by the tolerable pressure drop through said fixed bed and the overall rate of extraction. The minimum charge rate of feed stock through said fixed bed is limited to a rate sufficient to avoid back mixing (i.e., to maintain substantially plug flow through said beds). These rates will be dependent upon the type of charge stock used and the conditions of pressure and temperature employed in the operation of the sorbent contacting chamber. It is convenient to use the concept of space velocity in defining the ratio of feed stock charge rate to quantity of sorbent. The term liquid hourly space velocity will be used herein and is defined as the charge rate of feed stock at conditions of 60° F. and one atmosphere in cubic feet per hour divided by the cubic feet of solid sorbent. It is expected that liquid hourly space velocities of from about 0.01 to about 2.0 will be employed depending upon the operating conditions of pressure and temperature, the feed stock, the polar molecule and the equipment limitations.

Referring back to FIGURE 1, the raffinate flowing in flow conduit 117 is introduced into raffinate fractionator 20. The overhead fraction is removed through flow conduit 21, cooler 22 and into overhead receiver 23. A portion of the overhead is returned to fractionator 20 as reflux by means of flow conduit 24. The net overhead is removed from overhead receiver 23 through boot 48 by means of flow conduit 25. The boot is provided so that any separate water phase is returned into the circulating system thus allowing better control of the water concentration in recycled desorbent and avoiding the necessity of adding water once the system has reached equilibrium. In this particular arrangement the net overhead comprises a portion of the desorbent. The bottom fraction is removed through flow conduit 26 where a portion flows through flow conduit 27, heater 28 and returns to fractionator 20. The net bottoms fraction leaves the system through flow conduit 29 and comprises the relatively less sorbed fraction of the feed stock.

The sorbate fraction leaves sorbent contacting chamber through flow conduit 124 where it flows into sorbate fractionator 30. The overhead fraction is removed through flow conduit 31, cooler 32 and into overhead receiver 33. A portion of the overhead is returned to fractionator 30 as reflux by means of flow conduit 34. The net overhead is removed from overhead receiver 33 through boot 49 by means of flow conduit 35. The bottoms fraction is removed through flow conduit 36 where a portion flows through flow conduit 37, heater 38 and returns to fractionator 30. The net bottoms fraction leaves the system through flow conduit 39 and comprises the selectively sorbed fraction of the feed stock.

The net overheads from fractionator 20 and fractionator 30 are combined in flow conduit 40 and comprise the desorbent. The flow scheme here envisioned employs a desorbent lighter than the feed stock. However, the process would function equally well if the desorbent were heavier than the feed stock except the bottoms fraction would then comprise the desorbent. The combined desorbent flows through flow conduits 40, 47 and 128 where it finally returns to sorbent contacting chamber 46. In order to control the water concentration of the zeolite inside chamber 46, the feed stock and the desorbent water concentration must be controlled. The flow scheme presented in FIGURE 1 envisions drying the feed stock and adjusting the water concentration in the desorbent so as to control the water concentration of the zeolite. Therefore, chamber 50 represents a suitable dryer to remove moisture from the incoming feed stock. Chamber 41 represents a water saturator and chamber 42 represents a dryer. Normally, valves 43 and 44 will be closed, thus all the desorbent will bypass both chambers 41 and 42 by means of flow conduit 47. As long as the proper water concentration is maintained in the overall system shown in FIGURE 1, it should not be necessary to adjust the water concentration by means of either chambers 41 or 42. The water that leaves sorbent contacting chamber 46 by means of the raffinate or the sorbate effluents will go overhead in their respective fractionators and end up in the overhead receivers. If the water should separate out as a water phase, it will settle in the boots of the overhead receivers. Therefore, this water will be returned to the sorbent contacting chamber 46 by means of the desorbent stream. Since the water that leaves chamber 46 returns to chamber 46, a constant amount of water will be maintained in the overall system. It becomes a simple matter to control the water concentration on the zeolite in chamber 46 by analyzing either the raffiniate or the sorbate streams for the water concentration and, if the value is too low, to open valve 43 and add water to the system or, if the value is too high, to open valve 44 to remove water from the system. For example, if it is desired to maintain the water concentration on the zeolite at 2.5 wt. percent and this requires a water concentration of 30 parts per million in the hydrocarbon surrounding the zeolite, then the said 2.5 wt. percent concentration will be maintained as follows. Analyzer 51 and/or analyzer 52 are instruments capable of continuously analyzing the water concentration of the hydrocarbons of the raffinate and sorbate streams, respectively. The analyzer is instrumented such that if the water concentration in one effluent stream falls below a preselected level (some value less than 30 p.p.m.), it will send a signal to open valve 43 so as to add water to the system. After the water concentration has increased in said one effluent, the analyzer will send a signal to close valve 43. If the water concentration in one effluent stream increases above a preselected level (some value greater than 30 p.p.m.), the analyzer will detect the increase and open valve 44 so as to remove water from the desorbent. When said one effluent's water concentration has decreased, the analyzer will send a signal to close valve 44. It is apparent that either effluent streams may be used to analyze the water concentration and analyzers are shown on both effluents in FIGURE 1. However, only one analyzer is actually needed. Once the proper water level has been attained in the system, it should not be necessary either to add or remove water since there is no way for the water to leave the system. However, the above system can still be used to change the water concentration to a different concentration when such conditions arise as would require that a change be made.

The process shown in FIGURE 1 may be employed to separate normal aliphatic hydrocarbons from fluid mixtures. The extent of extraction is enhanced over prior art processes due to the incorporation of water in concentrations of from 0.5 to 4 wt. percent upon the zeolite.

*Example I.*—Commercially prepared 5 Angstrom unit molecular sieves are activated by drying said sieves over dry nitrogen at 660° F. to a moisture content of less than 0.2 wt. percent. One hundred and fifteen grams of dried sieves are loaded into a glass tube having a volume of 160 cc. The tube is then filled with normal decane and is allowed to come to equilibrium at a temperature of 450° F. and at a pressure of 350 p.s.i.g.

Figure 3:
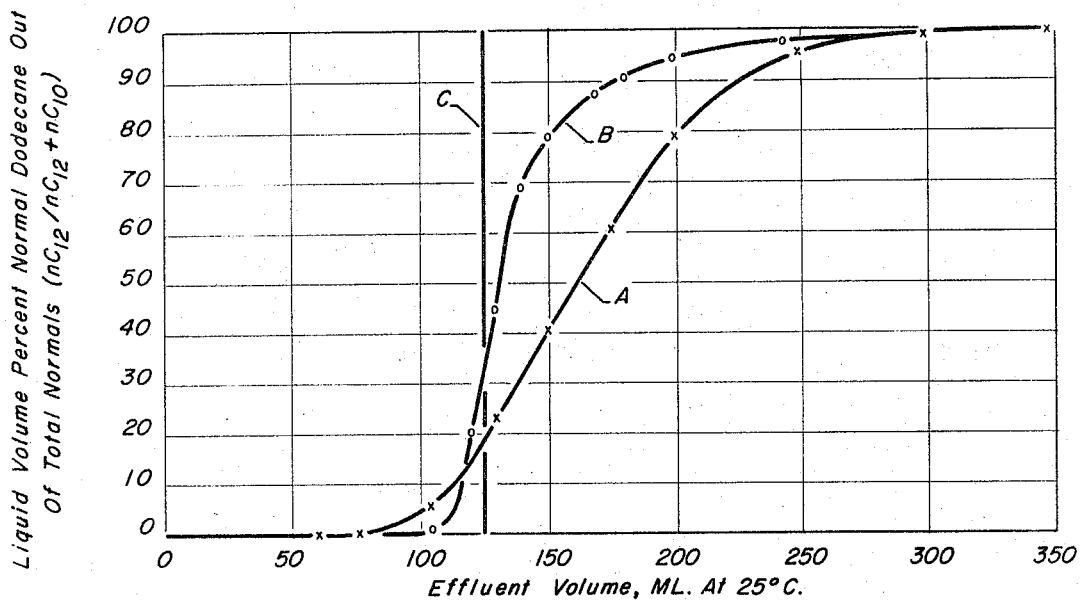

A liquid containing 84 volume percent 2,2,4-trimethyl pentane and 16 volume percent normal dodecane is introduced downflow into the tube at a rate to give a 0.75 liquid hourly space velocity. Liquid hourly space velocity is defined as the flow rate of hydrocarbon in volumes per hour divided by the volume of sieves. Samples of the displaced effluent from the tube are taken at periodic intervals and analyzed by liquid chromatography methods. The results of this experiment is shown in the A line in FIGURE 3 which is a plot of the concentration of normal dodecane in the effluent relative to total normals in the effluent against the total effluent volume.

A portion of the activated sieves are contacted with a gas stream containing moisture under controlled conditions so as to uniformly incorporate 2.4 wt. percent water into the sieves. This water concentration is checked by gravimetric laboratory analysis.

The "wet sieves" containing 2.4 wt. percent are placed in the above described tube and a similar experiment as described above is performed upon said wet sieves. The results of this experiment are also plotted on the graph in FIGURE 3. The B line corresponds to the results of the wet sieves.

It should be noted that the rate of change in concentration for the wet sieves is greater than the rate of the dried sieves. For example, the slope of the dry sieve line between the 20% and the 80% dodecane concentration in the effluent is 0.78, whereas in the case of the wet sieve the same slope is 1.76. A theoretically perfect sieve that requires no time for desorption would show a vertically straight line as shown by the C line. It is apparent that the "wet sieves" show a greatly enhanced performance for the selective extraction of dodecane over decane than the dry sieves and more closely approximates the absolute theoretical limit.

*Example II.*—Another batch of commercially prepared 5 Angstrom unit molecular sieves are activated by drying said sieves over dry nitrogen at 660° F. to a moisture content of less than 0.2 wt. percent. One hundred and thirty-one grams of dried sieves in a 20–50 mesh size range are loaded into a glass tube having a volume of 160 cc. The tube is then filled with normal dodecane and is allowed to come to equilibrium at a temperature of 450° F. and at a pressure of 350 p.s.i.g.

Figure 4:
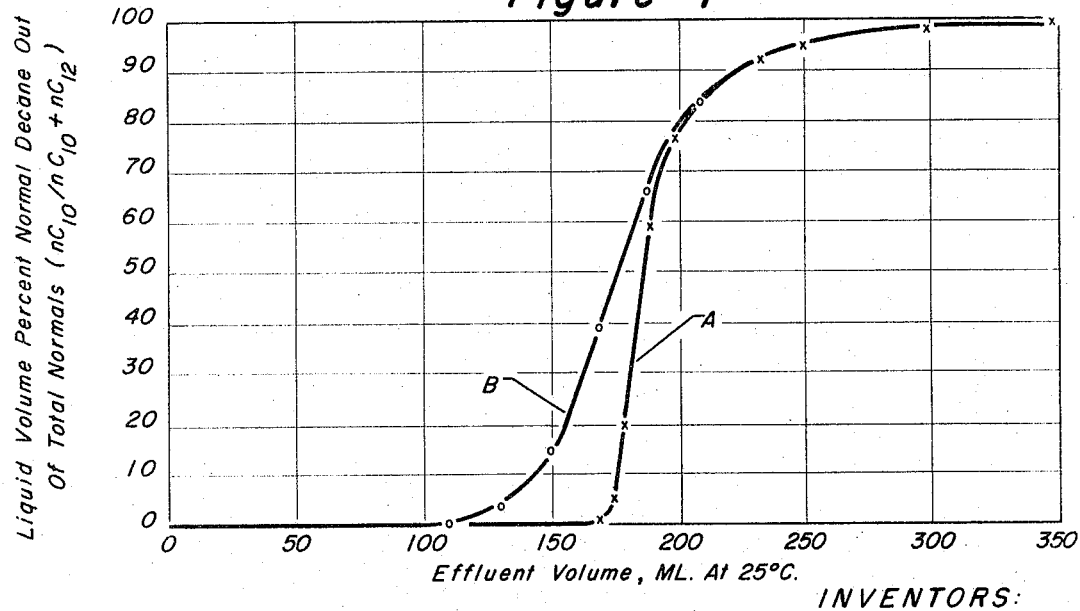

A liquid containing 83.8 volume percent 2,2,4-trimethyl pentane and 16.2 volume percent normal decane is introduced downflow into the tube at a rate to give a 0.74 liquid hourly space velocity. Samples of the displaced effluent from the tube are taken at periodic intervals and analyzed by liquid chromatography methods. The results of this experiment are shown in the A line in FIGURE 4 which is a plot of concentration of normal decane in the effluent relative to total normals in the effluent against the total effluent volume.

A portion of the activated sieves are contacted with a moist nitrogen stream under controlled conditions so as to uniformly incorporate 2.2 wt. percent water into the sieves. This water concentration is checked by gravimetric laboratory analysis.

One hundred and thirty-four grams of these "wet sieves" containing 2.2 wt. percent water are placed in the above described tube and a similar experiment as described above is performed upon said wet sieves. The B line in FIGURE 4 corresponds to the results of the wet sieves.

It should be noted that in this case of normal decane displacing normal dodecane, the rate of change in concentration for the wet sieves is lower than the rate of the dried sieves. This result coupled with the results in Example I indicate that the incorporation of water into the molecular sieves has the effect of showing an increase in the rate of sorption of the molecular sieve for normal dodecane as compared to normal decane.

*Example III.*—Equipment is assembled and arranged as shown in FIGURE 1. A total of 11.85 gallons of 5 Angstrom unit molecular sieves are loaded in chamber 46, a proportionate amount in each zone. A feed stock is selected comprising a kerosene containing 23.0 wt. percent normal paraffins and having substantially all the hydrocarbon molecules within the range of from 11 to 14 carbon atoms per molecule. A desorbent is selected comprising a mixture of 25 wt. percent iso-octane and 75 wt. percent normal heptane. Said feed stock is introduced into flow conduit 122 at a rate of 2.9 gallons per hour measured at 60° F. Sufficient desorbent is introduced into inventory surge pot 53 through flow conduit 54. The flow control valve 129 is adjusted to allow a desorbent flow rate of 4.9 gallons per hour measured at 60° F. A temperature of 425° F. and a pressure of 350 p.s.i.g. is maintained in chamber 46. The processing of said feed stock is carried out as hereinbefore described until 40 gallons of feed stock per pound of molecular sieve are processed through flow conduit 122. During said 40 gallons per pound of processing, dryer 42 is operative a sufficient period of time to control water level on the molecular sieves to less than 0.2 wt. percent.

After said 40 gallons per pound time period a material balance is made around the entire plant with the sieves containing less than 0.2 wt. percent water. It is calculated that the sorbate stream leaving flow conduit 39 contains 100 wt. percent of the normal undecane, 78 wt. percent of the normal dodecane, 60 wt. percent of the normal tridecane and 60 wt. percent of the normal tetradecane that was present in the kerosene feed stock. The overall normal purity of said sorbate stream is 96.9 wt. percent.

After the above material balance is completed, valve 43 is opened to allow the desorbent to pass through water saturation 41. The water level on the molecular sieves in chamber 46 is allowed to increase until the raffinate stream flowing in flow conduit 117 contains approximately 15 parts per million of water. Valve 43 is then closed and the system is allowed to come to equilibrium. It is estimated that 15 parts per million in the raffinate will result in a water content of 1.6 wt. percent of the molecular sieve.

After reaching equilibrium, a second material balance is made around the entire plant. The operating conditions are substantially the same as were present in the first material balance. It is calculated that the sorbate stream leaving flow conduit 39 contains 100 wt. percent of the normal undecane, 91 wt. percent of the normal dodecane, 83 wt. percent of the normal tridecane and 83 wt. percent of the normal tetradecane that was present in the kerosene feed stock. The overall normal plurity of said sorbate stream is 98.4 wt. percent.

Comparing the results of the two material balances shows that increasing the water content on the molecular sieves in chamber 46 from less than 0.2 wt. percent to about 1.6 wt. percent allows an increase in extraction of 13 wt. percent normal dodecane, 23 wt. percent of normal tridecane and 23 wt. percent of normal tetradecane. This is a result of the greater rates of sorption of these normal compounds into the porous structure of the molecular sieve as a result of incorporating the water into the molecular sieve.

We claim as our invention:

1. A method for improving the selective extraction of a zeolite selective for normal aliphatic hydrocarbons which comprises maintaining within the porous structure of said zeolite during the extraction from about 0.5 to about 4 weight percent of water.

2. A process for the separation of components of a fluid mixture, at least one of which is selectively sorbed by contact with a solid sorbent, said process comprising the steps:
introducing said fluid mixture into contact with a bed of solid sorbent particles,
withdrawing from said bed a first effluent comprising relatively less sorbed component of said fluid mixture,
introducing a desorbing fluid comprising another selectively sorbed component into contact with said bed of solid sorbent particles,
withdrawing from said bed a second effluent comprising selectively sorbed component of said fluid mixture,
and maintaining on said sorbent from about 0.5 to about 4 weight percent of water.

3. The process of claim 1 further characterized in that the fluid mixture is a hydrocarbon mixture and the selectively sorbed component is a normal aliphatic hydrocarbon.

4. A process for the separation of a normal aliphatic hydrocarbon from a fluid hydrocarbon mixture, said process comprising the steps:
introducing said fluid hydrocarbon mixture into contact with a bed of solid zeolitic metal aluminosilicate particles selective for normal aliphatic hydrocarbons,
withdrawing from said bed a first effluent comprising relatively less sorbed component of said fluid hydrocarbon mixture,
introducing a desorbing fluid comprising another normal aliphatic hydrocarbon into contact with said bed of solid zeolite particles,
withdrawing from said bed a second effluent comprising selectively sorbed component of said fluid hydrocarbon mixture,
and maintaining within the porous structure of said zeolite from about 0.5 to about 4 weight percent of water.

5. The process of claim 4 further characterized in that said metal aluminosilicate has an effective pore size of about 5 Angstrom units.

6. A process for the separation of components of a fluid mixture at least one of which is selectively sorbed by contact with a solid sorbent, said process comprising the steps:
introducing said fluid mixture into a first zone of a fixed bed of said solid sorbent containing at least four serially interconnected zones having fluid flow connecting means between adjacent zones and between the outlet of one terminal zone and the inlet of the other terminal zone in the series to thereby provide cyclic fluid flow in said process,
substantially simultaneously withdrawing relatively less sorbed raffinate from a second zone immediately downstream of said first zone,
substantially simultaneously introducing a desorbing fluid into a third zone immediately downstream of said second zone,
substantially simultaneously withdrawing resulting sorbate comprising selectively sorbed component from a fourth zone immediately downstream of said third zone,
continuously circulating a stream of fluid through said series of interconnected zones,
periodically advancing downstream the point in said fixed bed of introducing said fluid mixture while simultaneously and equally advancing downstream the point of introducing desorbent and withdrawing raffinate and sorbate,
and maintaining within the porous structure of said sorbent from about 0.5 to about 4 weight percent of water.

7. A crystalline synthetic zeolite material comprising the elements silicon, aluminum, oxygen, at least one cation selected from the group of materials consisting of hydrogen, ammonium, metals in Group I and Group II of the Periodic Table and the transition metals of the Periodic Table and having water incorporated within its porous structure of from about 0.5 to about 4 weight percent.

8. A crystalline synthetic zeolite material having a composition in terms of oxides of $$1.0\pm0.2M_{2/n}O:Al_2O_3:1.85\pm0.5SiO_2$$

wherein M represents at least one of the materials in the group consisting of hydrogen, ammonium, metals in Group I and Group II of the Periodic Table and the transition metals, $n$ represents the valence of M and having water incorporated within its porous structure of from about 0.5 to about 4 weight percent.

9. A crystalline synthetic zeolite material having a molecular composition in terms of oxides of $$1.0\pm0.2M_{2/n}O:Al_2O_3:1.85\pm0.5SiO_2$$

wherein M represents at least one of the materials in the group consisting of sodium, calcium, potassium and magnesium, $n$ represents the valence of M and having water incorporated within its porous structure of from about 0.5 to about 4 weight percent.

10. A crystalline synthetic zeolite material having an effective pore size of about 5 Angstrom units and having water incorporated within its porous structure of from about 0.5 to about 4 weight percent.

11. In the preparation of a synthetic zeolite the step of adjusting the water content of said zeolite to the range of from about 0.5 to about 4 weight percent.

12. In a process for the separation of organic liquids employing synthetic zeolites, the step of adjusting the water content of said zeolite to the range of from 0.5 to about 4 weight percent.

13. In a process for the separation of hydrocarbon liquids employing synthetic zeolites, the step of adjusting the water content of said zeolite to the range of from 0.5 to about 4 weight percent.

14. In a process for the separation of straight chain aliphatic hydrocarbons from a mixture of hydrocarbons employing synthetic zeolites, the step of adjusting the water content of said zeolite to the range of from 0.5 to about 4 weight percent.

15. A process for the separation of straight chain aliphatic hydrocarbons from a mixture of hydrocarbons, said process comprising the steps:
introducing a fluid hydrocarbon mixture into contact with a bed of solid zeolite particles,
withdrawing from said bed a first effluent comprising relatively less sorbed component of said fluid hydrocarbon mixture,
introducing a desorbing fluid comprising straight chain aliphatic hydrocarbons into contact with said bed of solid zeolite particles,
withdrawing from said bed a first effluent comprising selectively sorbed component of said fluid hydrocarbon mixture, while maintaining the water content of said zeolite particles within the range of from 0.5 to about 4 weight percent.

16. A process for the separation of straight chain aliphatic hydrocarbons from a mixture of hydrocarbons, said process comprising the steps:

introducing said hydrocarbon mixture into a first zone of a fixed bed of solid zeolitic metal aluminosilicate particles containing at least 4 serially interconnected zones having fluid flow connecting means between adjacent zones and between the outlet of one terminal zone and the inlet of the other terminal zone in the series to thereby provide cyclic fluid flow in said process, substantially simultaneously withdrawing relatively less sorbed raffinate from a second zone immediately downstream of said first zone, substantially simultaneously introducing a desorbent into a third zone immediately downstream of said second zone, substantially simultaneously withdrawing resultant sorbite comprising selectively sorbed component from a fourth zone immediately downstream of said third zone, continuously circulating a stream of fluid through said series of interconnected zones, periodically advancing downstream the point in said fixed bed of introducing said hydrocarbon mixture while simultaneously and equally advancing downstream the point of introducing desorbent and withdrawing raffinate and sorbate, and maintaining water on said zeolite particles at concentrations of from about 0.5 to about 4 weight percent.

17. In a process for the separation of normal aliphatic hydrocarbons from fluid mixtures employing zeolitic metal aluminosilicates as a selective sorbent, the step of adding water so as to maintain water concentrations of from about 0.5 to about 4 weight percent within the porous structure of the zeolite.

18. In a process for the separation of normal aliphatic hydrocarbons from a fluid mixture by contacting said fluid mixture with a zeolite selective for normal aliphatic hydrocarbons, the step of measuring the water concentration of at least one of the effluent streams from said zeolite and adjusting the water concentration of at least one of the inlet streams to said zeolite so as to maintain a desired water concentration on said zeolite.

19. In a process for the separation of normal aliphatic hydrocarbons from fluid mixtures by contact with a selective zeolite in which a desired water concentration on the zeolite is maintained, the method of controlling said water concentration by adjusting the water level in the effluent sorbate upward by adding liquid water to the desorbent and downward by drying the desorbent so as to maintain a predetermined sorbate water concentration.

20. In a process for the separation of normal aliphatic hydrocarbons from fluid mixtures by contact with a selective zeolite in which a desired water concentration on the zeolite is maintained, the method of controlling said water concentration by adjusting the water level in the effluent raffinate upward by adding liquid water to the desorbent and downward by drying the desorbent so as to maintain a predetermined raffinate water concentration.

21. In a process for the separation of normal aliphatic hydrocarbons from fluid mixtures by contact with a selective zeolite in which a desired water concentration on the zeolite is maintained, the method of controlling said water concentration by adjusting the water level in the effluent sorbate upward by adding liquid water to said fluid mixture and downward by drying said fluid mixture so as to maintain a predetermined sorbate water concentration.

22. In a process for the separation of normal aliphatic hydrocarbons from fluid mixtures by contact with a selective zeolite in which a desired water concentration on the zeolite is maintained, the method of controlling said water concentration by adjusting the water level in the effluent raffinate upward by adding liquid water to said fluid mixture and downward by drying said fluid mixture so as to maintain a predetermined raffinate water concentration.

References Cited by the Examiner

UNITED STATES PATENTS

| | | | |
|---|---|---|---|
| 3,037,338 | 6/1962 | Thomas | 260—676 |
| 3,070,542 | 12/1962 | Asher et al. | 208—310 |
| 3,106,593 | 10/1963 | Benesi et al. | 260—676 |
| 3,201,491 | 8/1965 | Stine et al. | 208—310 |

ALPHONSO D. SULLIVAN, *Primary Examiner.*